Figure 1:
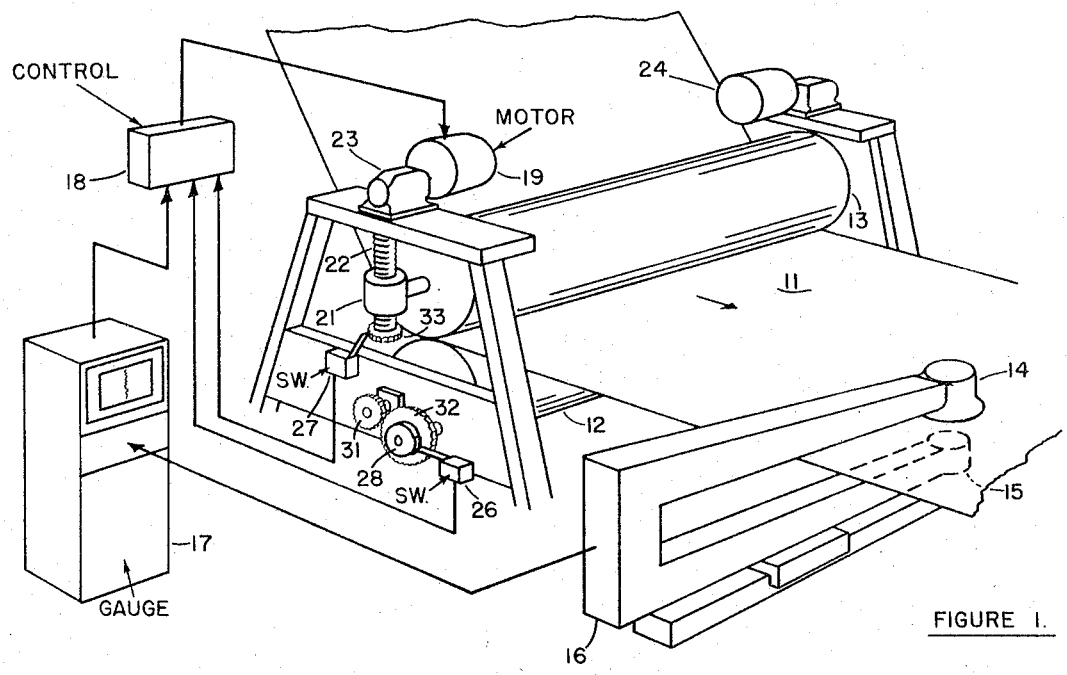

Dec. 20, 1966 J. G. WOOD 3,292,208
PROCESS CONTROL SYSTEM
Filed Oct. 17, 1963

INVENTOR.
JOHN G. WOOD
BY Robert S. Toperzer
Atty.

3,292,208
PROCESS CONTROL SYSTEM
John G. Wood, Hingham, Mass., assignor to Laboratory For Electronics, Inc., Boston, Mass., a corporation of Delaware
Filed Oct. 17, 1963, Ser. No. 317,011
6 Claims. (Cl. 18—2)

This invention relates generally to process controls and, more particularly, it is concerned with an automatic mode of process control which is uneffected by backlash in the control mechanism.

In an increasing number of industrial processes, automatic means have been devised to control the characteristics of a product which must be held to close tolerances. A device which has accelerated the development of controls of this type is the beta gauge, wherein the absorptive effect of the product on penetrative radiation is relied on as a measure of density, thickness, and other related parameters. A major advantage of the beta gauge is its high degree of measuring accuracy. Due to the nature of the mechanism used to control characteristics of many types of products, it sometimes becomes a problem, however, to translate accurate measures of the characteristic into a precise mode of corrective action designed to maintain tolerance requirements. An example of where this problem arises is in the calendering of rubber or plastic and in the rolling of metal to obtain a desired thickness. To control the thickness of the material, usually the rolls which exert pressure on the material to alter its thickness are journalled in bearing boxes which are adapted to be moved up and down by means of a screw mechanism. Each screw is driven by a motor through a gear transmission. Since the movement of the rolls required to bring the thickness within tolerance may be relatively small, often as little as ten thousandths of an inch, it follows that the speed reduction ratio of the transmission must be substantial. This makes it difficult, if not impossible, to avoid backlash in the gearing with the result that successive corrections of opposite sense cannot be achieved in the same way as successive corrections of the same sense, at least with conventional modes of control.

A process control system which overcomes this problem is disclosed and claimed in Patent No. 3,024,404, issued March 6, 1962, to Garret F. Ziffer, and assigned to the same assignee as the present invention. In this system, means are provided to signal when a correction is required which differs in sense from the last previous correction. Then in response to this signal, a fixed amount of compensation is applied to the signal which controls the operation of the screw down motor so that the controlled variation introduced in the process will more nearly conform the product characteristic to the standard desired. Although this system has been used extensively in many industrial applications and found to be effective, in certain applications the error due to variations in the amount of backlash present cannot be tolerated. Such variations are caused by wear, for one thing, but more significantly by changes in the specifications for the product which make it necessary to change the roll pressure. According to the present invention, the problem of backlash in the gear transmission is avoided entirely.

An object of the present invention, therefore, is to provide a more accurate mode of control of a process variable.

A more specific object is to automate the operation of controlling a process variable in a way which avoids inaccuracies due to backlash in the control mechanism.

Another object is to provide a process control system wherein the foregoing objects are achieved simply and reliably.

Still another object is to provide a process control system of the above mentioned character which has general applicability to a variety of processes.

Figure 2:
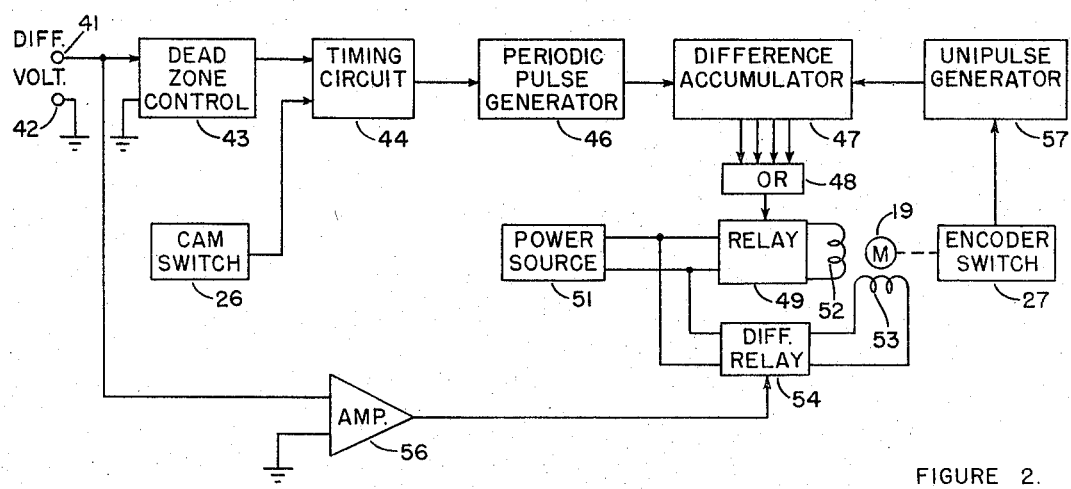

In brief, the invention contemplates the use of a train of pulses to represent in terms of its count, the extent to which a characteristic of the product has deviated from the standard desired. After the pulses are generated, their count is stored in a register for comparison with a second train of pulses. The latter are initiated by an encoder responsive to the mechanical displacement of a movable element used to introduce controlled variations in the process. When a correction in the process of establishing the desired characteristic is required, the control mechanism is enabled to produce displacement of the movable element. So long as the control mechanism is enabled, the movable element continues to be displaced and a pulse is entered in the register for each unit of its displacement. When the count of the pulses in this second train becomes equal to that in the first train, as evidenced by the count in the register standing at zero, the control device is prevented from making any further corrections. At such later time as the correction has been reflected in the product characteristic and still a deviation from the desired standard has been found to exist, the operation is repeated a second time, and so on, at successive intervals determined by the nature of the process and the measuring device which is used to sense deviations. Although it is apparent that the principles of the invention are applicable to various kinds of processes and various kinds of measuring devices, the invention will be described in detail, for purposes of illustration, in the context of a calendering mill wherein the thickness of the product is measured by a beta gauge. Other objects and advantages of the invention will become apparent from the following detailed description of this embodiment and from the drawing to which the description refers. In the drawing:

FIG. 1 is a perspective view of the system according to the invention with certain elements illustrated in block form; and FIG. 2 is a block diagram of the system according to the invention.

With reference now to the drawing and, more particularly, to FIG. 1, it will be observed that the sheet material being calendered is designated by the numeral 11 and its direction of movement is from left to right. Towards the left are the calendering rolls 12 and 13 which are driven by some suitable means, not shown, and down the line towards the right is the measuring apparatus for measuring the density or thickness of the material, as determined by the pressure of the rolls. The measuring apparatus is seen to include a pair of gauge heads 14 and 15, which are carried by a C frame 16. Conventionally the C frame is mounted so that it can be moved transversely of the material to enable the heads to sense the thickness at various points along its width. In the upper head is a source of penetrative radiation, a suitable radioactive isotope, and in the lower head is a radiation detector to measure the absorptive effect of the material on the radiation. By means of an electronic unit 17, associated with the detector, the output of the latter is translated into a differential voltage whose magnitude is indicative of the thickness of the material in terms of deviations from a standard thickness. The circuitry employed in the electronic unit 17 may be entirely conventional, as is likewise true of the gauge assembly itself. Accordingly, unit 17 may include, in addition to the circuitry for developing the differential voltage, a chart recorder to provide a continuous indication of the thickness of the material, together with various controls for calibrating the measuring apparatus and selecting the target value of thickness desired.

The signal or voltage from unit 17 is applied to a control 18 shown in block form in FIG. 1 which serves to control the operation of a motor 19. By means of the motor, one side of the upper calender roll 13 is caused to move up or down to change the pressure of the rolls and to this end, the roll is mounted for rotation in a journal 21 which is adapted to act as a nut. The nut cooperates with a lead screw 22 which is driven by the motor 19 through a gear transmission 23. In actual practice, the other side of the roll 13 is similarly mounted and the motor to move this side of the roll up and down is designated 24. No connections are shown to this motor in order to simplify the drawing, but it should be understood that the motor 24 has associated with it a control like control 18 which is also responsive to the differential voltage from the gauge.

In addition to the gauge voltage input to control 18, the latter is also provided with a timing signal from a switch 26, and a displacement signal from a switch 27. Switch 26 is actuated by a cam 28, which is driven from the calender roll 12, a pair of gears 31 and 32 being used for this purpose. The gear ratio is determined by the spacing of the gauge heads 14 and 15 from the nip of the calender rolls, as will become apparent from the description of FIG. 2. Switch 27 is actuated intermittently by the teeth of a gear 33 which is rigidly mounted on the lower end of the screw 22. In other words, while the screw is turning the switch 27 will be actuated once for each unit of rotation of the screw corresponding to the angular spacing between the teeth on the gear 33. As in the case of the control for the motor 24 which acts on the other side of the roll, it should be understood that there is a switch like switch 27 which corresponds in like manner to rotation of the screw on this side for the purpose of controlling the motor 24. Switch 26 has no counterpart on the other side of the roll, since its response is independent of the up and down movement of the rolls which may differ from side to side.

In FIG. 2 there is shown a detailed block diagram of the control 18 for the motor 19 which, as aforementioned, is identical with the control for motor 24. With reference now to FIG. 2, it will be observed that the numerals 41 and 42 designate the gauge terminals where the differential voltage is furnished. The magnitude of the voltage represents the extent of a deviation from the desired thickness and the sense or phase of the voltage represents the sense of the deviation. Connected to terminals 41, 42 is a dead zone control 43 which serves to establish the permissible tolerance limits. Control 43 may comprise a conventional gating circuit, together with a threshold detector circuit which effectively opens the gate when the magnitude of the differential voltage exceeds a predetermined value. Under these circumstances the gate is conditioned to pass the differential voltage from terminals 41, 42 to a timing circuit 44.

The timnig circuit is periodically enabled by cam switch 26 to generate a pulse whose duration is determined by the magnitude of the voltage passed by the dead zone control 43. An example of a conventional circuit which operates in this way is the phantastron circuit. An advantage of the phantastron circuit is that it is not phase sensitive so that the polarity of the pulse it produces is the same, irrespective of the sense of the thickness deviation. Each pulse from the timing circuit 44, in turn, enables a periodic pulse generator 46 to produce scaling pulses at a fixed rate so long as the timing pulse from circuit 44 endures. It follows that the number of scaling pulses produced in response to any given timing pulse from circuit 44 is representative of the width of the timing pulse. These pulses are counted in a difference accumulator or counter 47 which compares their number with the number of pulses in a second train which are generated in a manner to be described.

As shown, accumulator 47 has four output stages corresponding to four digit places representing the count. It will be appreciated, however, that the number of digit places is not significant and it could be more or less depending upon the degree of accuracy desired. To sense when the count is other than zero, the outputs from the accumulator are connected to a circuit 48 which performs a logical OR function. That is, when a signal is present on any of the accumulator output lines, an output signal is produced by the OR circuit. When no signal is present, representing that the count is zero, no output signal is produced.

Connected to this latter circuit is the control circuit of a relay 49. Relay 49 provides power from a source 51 to the main winding 52 of motor 19. Also associated with the motor is a control winding 53 to control the direction of rotation of the motor. Power from source 51 is applied to the control winding through a differential relay 54 whose condition determines the phase of the voltage applied to this winding. That is to say, when the relay is actuated by a differential voltage of one sense, it phases the control winding so as to produce clockwise rotation of the motor; and when a differential voltage of the opposite sense is applied to relay 54, it produces a phase reversal of the voltage on winding 53 causing the motor to rotate in the opposite direction. The differential voltage to operate the relay is derived from terminals 41, 42, by way of an amplifier 56.

It will be recalled from FIG. 1, that motor 19 drives the screw for raising and lowering one end of the calender roll and that so long as the motor is running, the teeth on the gear 33 intermittently operate the switch 27. In FIG. 2 it will be observed that switch 27 serves to enable a unipulse generator 57 to produce one pulse for each closure of the switch. Generator 27 may take the form of a multivibrator, for example, which according to the invention is used to produce a second train of pulses for comparison with the pulses from generator 46 in the accumulator or counter 47.

A specific example of the operation of the system will serve to illustrate the functional inter-relation of the elements of the system. By way of example, let it be assumed that the density of the material has deviated from the standard or target value by four units of measure, whereas the tolerance is only one unit of measure. The result will be that a voltage is caused to appear at terminals 41, 42 whose magnitude represents the measured deviation as sensed by the gauge in FIG. 1. Control 43 (FIG. 2), in turn, senses that the magnitude of this voltage exceeds the predetermined limit corresponding to the desired tolerance of one unit and, in consequence, permits the voltage to act upon the timing circuit 44. As soon as the cam switch 26 closes, timing circuit 44 is thereby enabled to produce a pulse whose width corresponds to the value of the input terminal voltage passed by control 43. That is, the pulse has a duration of four units of time representing the four units of measure by which the density is off target.

The timing pulse from circuit 44 initiates a train of periodic pulses from pulse generator 46 and these pulses continue so long as the timing pulse endures. In this example, let it be assumed that eight periodic pulses, which may be referred to as measure scaling pulses, are produced corresponding to the four units of measure represented by the input terminal voltage. The eight measure scaling pulses are then entered in the accumulator. As will appear, the accumulator begins counting at zero so that relay 49 is initially disabled, but as soon as the first pulse is entered, the non-zero condition of the accumulator is sensed by OR circuit 48, actuating the relay 49, and causing motor 19 to start. The direction of rotation of the motors is determined by the phase or sense of the voltage applied to control winding 53 by relay 54. The relay, in turn, is conditioned to apply the proper phase by the signal from amplifier 56. Accordingly, the motor turns the lead screw in the proper direction according to whether the deviation is greater or less than the target value. Let it be assumed that the rotation of the lead screw is such as to lower the roll 13 and increase pressure so as to accomplish a reduction in thickness.

While the motor is running and the lead screw is turning, switch 27 is intermittently operated by the teeth on gear 33 enabling generator 57 to produce pulses, one pulse for each closure of the switch. These pulses may be referred to as displacement scaling pulses because they reflect the displacement of the roll in terms of the angular displacement of the lead screw. All of the eight measure scaling pulses, having been entered in the accumulator, the accumulator is now caused to count down in response to the displacement scaling pulses. That is, each of these pulses reduces by one the count previously accumulated. When the count has been reduced to zero, as a result of eight displacement scaling pulses having been entered in the accumulator, relay 49 is deenergized and motor 19 ceases to operate. Finally, cam switch 26 opens so that the process is prevented from repeating until the effect of the increased pressure of the rolls can be reflected in the density of the material as measured by the gauge. At such time, the cam switch 26 again closes, enabling the operation just described to be initiated once again, if the thickness is still out of tolerance.

Although the invention has been described in terms of a single preferred embodiment, various alternatives to this embodiment that are within the spirit and scope of the invention will no doubt occur to those skilled in the art. For example, a different mechanism may be used for controlling the pressure of the rolls. Moreover, the invention is not limited to use with calender rolls at all, but can be used in various processes where the control function involves the physical displacement of a movable element. Therefore, the invention should not be deemed to be limited to the details of what has been described by way of illustration, but it should be deemed to be limited only by the scope of the appended claims.

What is claimed is:

1. A control system for a process wherein a mechanically movable element is used to vary a characteristic of the product, said control system comprising means to measure the product characteristic to be controlled, means to generate a first train of pulses having a count determined by the measure of the characteirstic relative to a predetermined measure, means to displace the movable element so as to vary the characteristic when the actual measure differs from said predetermined measure, means to generate a second train of pulses having a count representing the displacement of said movable element, and means to disable said means for displacing the movable element when a predetermined numerical relation exists between the first and second counts, said means to disable the displacing means including a counter responsive to the difference between the first and second counts.

2. A control system as claimed in claim 1 including means to develop a measurement signal which represents, by its duration, the extent of a deviation from said predetermined measurement.

3. A control system as claimed in claim 2 wherein said means to generate a first train of pulses includes a periodic pulse generator, and means to enable said pulse generator to provide said counter with periodic pulses, while a said measurement signal endures.

4. A control system as claimed in claim 3 wherein said means to measure the product characteristic further includes means to initiate measurements of the product characteristic at intervals such that each controlled variation in the product characteristic is reflected in the measurement which succeeds the controlled variation.

5. A control system as claimed in claim 4 wherein said means to develop a measurement signal including means to compare deviations from said predetermined measure to a standard deviation, and to develop said first pulse train only in response to deviations exceeding said standard deviation.

6. A control system for a process wherein a mechanically movable element is used to vary a characteristic of the product, said control system comprising: means to measure the product characteristic to be controlled and to develop a measurement signal which represents by its duration the extent of a deviation from a predetermined measure; means to generate a first train of pulses having a count determined by the duration of said measurement signal; means to displace said movable element so as to vary the product characteristic when the actual measure differs from said predetermined measure; means to generate a second train of pulses having a count representing the displacement of said movable element, said means for generating said second train of pulses including a gear wheel adapted for rotation by said movable element and means to sense the arrival of the individual teeth on said gear wheel at a fixed station; and a difference counter to disable said means for displacing the movable element when said second count becomes equal to said first count.

References Cited by the Examiner

UNITED STATES PATENTS

| | | | |
|---|---|---|---|
| 2,884,531 | 4/1959 | Bosch | 18—2 X |
| 3,010,018 | 11/1961 | Ziffer. | |
| 3,024,404 | 3/1962 | Ziffer. | |
| 3,091,800 | 6/1963 | Gould et al. | 18—2 |
| 3,135,018 | 6/1964 | Smith | 18—2 |

WILLIAM J. STEPHENSON, *Primary Examiner.*